United States Patent [19]

Chi et al.

[11] Patent Number: 4,489,142
[45] Date of Patent: Dec. 18, 1984

[54] FUEL CELL COOLING ASSEMBLY

[75] Inventors: Chang V. Chi, Brookfield; Bernard S. Baker, Brookfield Center, both of Conn.

[73] Assignee: Energy Research Corporation, Danbury, Conn.

[21] Appl. No.: 552,017

[22] Filed: Nov. 17, 1983

Related U.S. Application Data

[63] Continuation of Ser. No. 321,255, Nov. 13, 1981.

[51] Int. Cl.$^3$ .............................................. H01M 8/24
[52] U.S. Cl. ........................................ 429/26; 429/38
[58] Field of Search ................... 429/26, 38, 39, 120, 429/148

[56] References Cited

U.S. PATENT DOCUMENTS

| | | | |
|---|---|---|---|
| 3,515,593 | 6/1970 | Nickols | 429/26 |
| 3,801,374 | 4/1974 | Dews et al. | 429/26 |
| 4,192,906 | 3/1980 | Maru | 429/13 |

OTHER PUBLICATIONS

The enumerated pages of the following reports covering a period from Oct. 1, 1977, to Apr. 1979 made under U.S. government contracts EY-76-C-03-1169 and DE-AC-03-79 ET 11301: Report 1, pp. 8-10, Oct. 1, 1977 to Dec. 31, 1977, Report 2, pp. 19-33, Apr. 1, 1977, to Apr. 1, 1978, and Report 6; pp. 16-36, Apr. 1, 1978 to Apr. 1979.

*Primary Examiner*—Donald L. Walton

[57] ABSTRACT

A gas cooling assembly for a fuel cell wherein a first carbonized plate includes opposing first and second surfaces, one of which having a plurality of grooves for carrying a cooling gas and a second carbonized plate includes first and second opposing surfaces, one of which is flat and abuts the grooves in said one surface of the first plate and the other of which has a plurality of grooves for carrying process gas.

2 Claims, 2 Drawing Figures

FUEL CELL COOLING ASSEMBLY

This application is a continuation of application Ser. No. 321,255, filed Nov. 13, 1981.

BACKGROUND OF THE INVENTION

This invention pertains to fuel cell systems and, in particular, to gas cooler assemblies for use in fuel cell stacks.

In fuel cell stacks, it is common to provide some type of cooling mechanism for cooling the stack fuel cells. U.S. Pat. No. 4,192,906 discloses one type of cooling mechanism wherein plate structure is supported in the stack and defines a cooling passage for carrying a cooling gas. Procedures for fabricating the aforesaid plate structure have been devised wherein two plates are used, each plate being provided with a plurality of grooves. These plates are then situated in the stack with corresponding grooves in alignment to thereby define cooling channels of desired capacity.

In order to reduce stack height, it is also desirable to additionally provide in each plate opposite the surface containing the cooling grooves, a further set of grooves for use as process gas channels. Usually the process gas grooves of the two plates will carry different process gases, thereby necessitating that they be situated in transverse relationships relative to each other. It is further desirable to form the plates from carbonizable material as e.g., graphite/resin, in order to realize enhanced electrical and thermal conductivity.

In one approach used to fabricate cooling assemblies comprised of plates of this type, the plates are first carbonized and then joined together so as to align the corresponding cooling gas grooves. However, it has been found that due to the inherent differences in the plates, each plate undergoes a different degree of shrinkage during carbonization, thereby making alignment of the sets of cooling grooves extremely difficult. This situation is further aggravated by the existence of the process gas grooves in each plate and exact alignment is never fully achieved. As a result, the electrical conductivity of the assembly is undesirably reduced and the cooling gas flow undesirably modified.

It is therefore an object of the present invention to provide a cooling assembly which does not suffer from the disadvantages described above.

SUMMARY OF THE INVENTION

In accordance with the principles of the present invention, the above and other objectives are realized in a practice wherein a carbonized plate having a flat first surface and a grooved opposite second surface for carrying process gas is situated with its flat surface adjacent a grooved first surface of a second carbonized plate, the flat surface and grooved first surface of the second plate defining channels for carrying a cooling gas. Since the cooling channels are defined by a flat surface and a grooved surface, misalignment problems and attendant losses in conductivity and change in gas flow encountered in the previous structures employing carbonized plates are avoided. An improved cooling assembly thereby results.

In one embodiment of the invention to be described hereinafter, the grooves of the first surface of the second plate are of dimension so as to provide the desired degree of cooling. In this case, the second surface of the second plate is also provided with process gas grooves which run transverse to the grooved second surface of the first plate.

In a second embodiment of the invention, the grooves of the first surface of the second plate are of dimension to partially provide the desired cooling. The second surface of the second plate, in turn, contains grooves which cooperate with the flat first surface of a third carbonized plate to define cooling channels which provide the remainder of the desired cooling. The second surface of this third plate has grooves running transverse to the grooves of the second surface of the first plate for carrying process gas.

BRIEF DESCRIPTION OF THE DRAWINGS

The above and other features and aspects of the present invention will become apparent upon reading the following detailed description in conjunction with accompanying drawings, in which.

DETAILED DESCRIPTION

Figure 1:
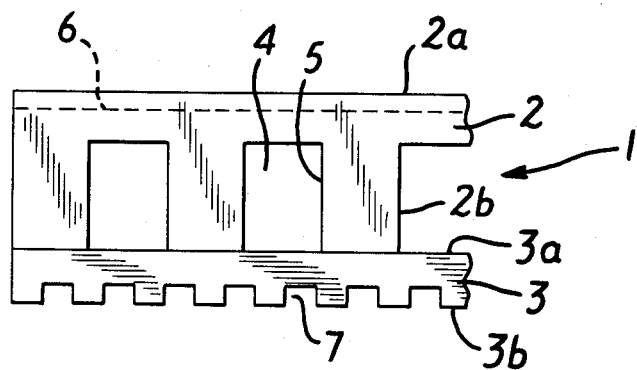
FIG. 1 illustrates a first gas cooling assembly in accordance with the principles of the present invention.

FIG. 1 illustrates a gas cooling assembly 1 in accordance with the principles of the present invention. The assembly 1 comprises a first plate 2 having first and second opposing plate surfaces 2a and 2b and a second plate 3 having opposing first and second plate surfaces 3a and 3b. In accordance with the invention, the plates 2 and 3 each comprise a carbonized material and together define cooling channels 4 of the cooling assembly. More particularly, in further accordance with the invention, the channels 4 are defined by the surface 2b, which contains cooling gas grooves 5, and the surface 3a, which is flat.

By utilization of a flat surface for the surface 3a, contact between the surfaces is increased, in comparison with plates whose surfaces are both grooved and, therefore, exhibit misalignment, which reduces the contact area. Electrical conductivity and gas flow of the assembly is thereby preserved. Additionally, the plates 2 and 3 can be provided with process gas channels 6 and 7 situated in transverse relationship without concern of creating or aggravating groove misalignment. An overall better cooling assembly is thereby achieved.

In FIG. 1, the grooves 5 in the surface 2b are of dimension to provide the desired cooling required of the assembly. In some cases, however, the depth of the grooves 5 might be such as to be undesirable from a fabrication and breakage standpoint. In this case, the embodiment of the cooling assembly 1 of FIG. 2 can be utilized.

Figure 2:
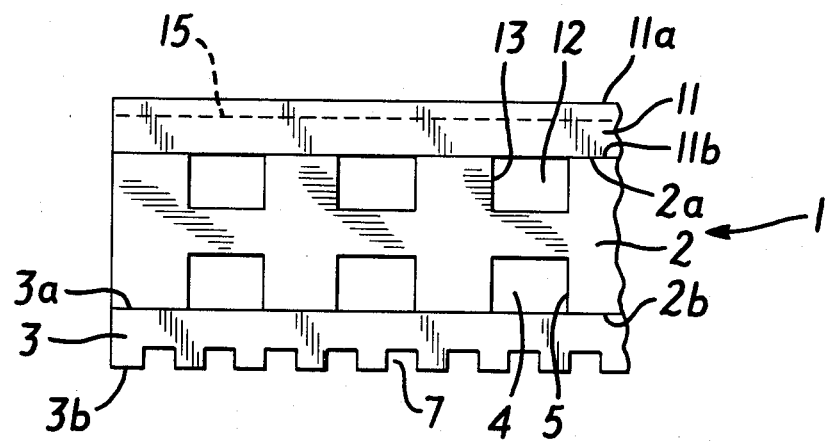
FIG. 2 shows a second gas cooling assembly in accordance with the principles of the present invention.

In FIG. 2, the plate 2 has been modified and a further third carbonized plate 11 has been added. More particularly, the grooves 5, defining with the surface 3a cooling channels 4, are now of a dimension which only partially provide the desired degree of cooling. The remainder of the desired cooling is, in turn, brought about by a second set of channels 12 realized by the cooling grooves 13 in the surface 2a of the plate 12 and the flat second surface 11b of the plate 11. In this case, the first surface 11a of the plate 11 is provided with process gas channels 15 arranged transverse to the channels 7 in the plate 3.

With the configuration of FIG. 2, the grooves in the surfaces 2a and 2b can each be of shallower depth than the grooves in the surface 2b of the assembly of FIG. 1 to acheive substantially the same cooling. As a result, fabrication difficulties and likelihood of breakage are significantly reduced, while electrical conductivity and gas flow are preserved similarly as in the FIG. 1 assembly.

In use, the cooling assemblies of FIGS. 1 and 2 can be supported within a fuel cell stack without adhesive bonding or adhesive bonding may be applied to the sides of the plates across the plate periphery to provide a more secure structure.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A gas cooler assembly comprising:
   a first plate having opposing first and second surfaces, said first surface having a plurality of grooves adapted to carry a cooling gas and said second surface having a plurality of grooves adapted to carry a cooling gas, said first plate being comprised of a carbonized material;
   a second plate having opposing first and second surfaces, said first surface being flat and abutting said second surface of said first plate to define with said grooves of said second surface channels for carrying a cooling gas and said second surface of said second plate having a plurality of grooves of shallower depth than the grooves of the first and second surfaces of said first plate for carrying a process gas, said second plate being comprised of a carbonized material;
   and a third plate having opposing first and second surfaces, said first surface being flat and abutting said first surface of said first plate to define with said grooves of said first surface of said first plate channels for carrying a cooling gas and said second surface of said third plate having a plurality of grooves of shallower depth than the grooves of the first and second surfaces of said first plate for carrying a process gas, said third plate being comprised of a carbonized material.

2. An assembly in accordance with claim 1 wherein:
   said assembly is to provide a predetermined degree of cooling;
   said grooves in said second surface of said first plate are dimensioned to provide a first amount of said predetermined cooling;
   and said grooves in said first surface of said first plate are dimensioned to provide the remaining amount of said predetermined cooling.

* * * * *